United States Patent [19]

Clack, Jr.

[11] 4,102,011
[45] Jul. 25, 1978

[54] HINGED DOOR QUICK RELEASE

[75] Inventor: Frederick Argles Clack, Jr., Avon, Conn.

[73] Assignee: United Technologies Corporation, Hartford, Conn.

[21] Appl. No.: 809,837

[22] Filed: Jun. 24, 1977

[51] Int. Cl.² .......................... E05D 7/12; B64C 1/00
[52] U.S. Cl. ..................................... 16/149; 16/171; 244/129.5
[58] Field of Search .................. 16/171, 128, 149; 180/69; 49/141; 244/129 D

[56] References Cited

U.S. PATENT DOCUMENTS

| 1,602,754 | 10/1976 | Delbridge | 16/149 |
| 2,564,988 | 8/1951 | Mullen | 244/129.5 |
| 3,085,297 | 4/1963 | Linderfelt | 244/129.5 |
| 3,183,548 | 5/1965 | Speakman | 244/129.5 X |
| 3,647,169 | 3/1972 | Allwright et al. | 244/129.5 |
| 3,851,845 | 12/1974 | Edwards | 244/129.5 |

Primary Examiner—Ronald Feldbaum
Attorney, Agent, or Firm—Vernon F. Hauschild

[57] ABSTRACT

An aircraft door adapted to pivot about a pair of vertical hinges is detachably fixed to the door frame by a secondary joint at each hinge. Retraction of a short horizontal pin at each secondary joint releases the door for jettison.

10 Claims, 2 Drawing Figures

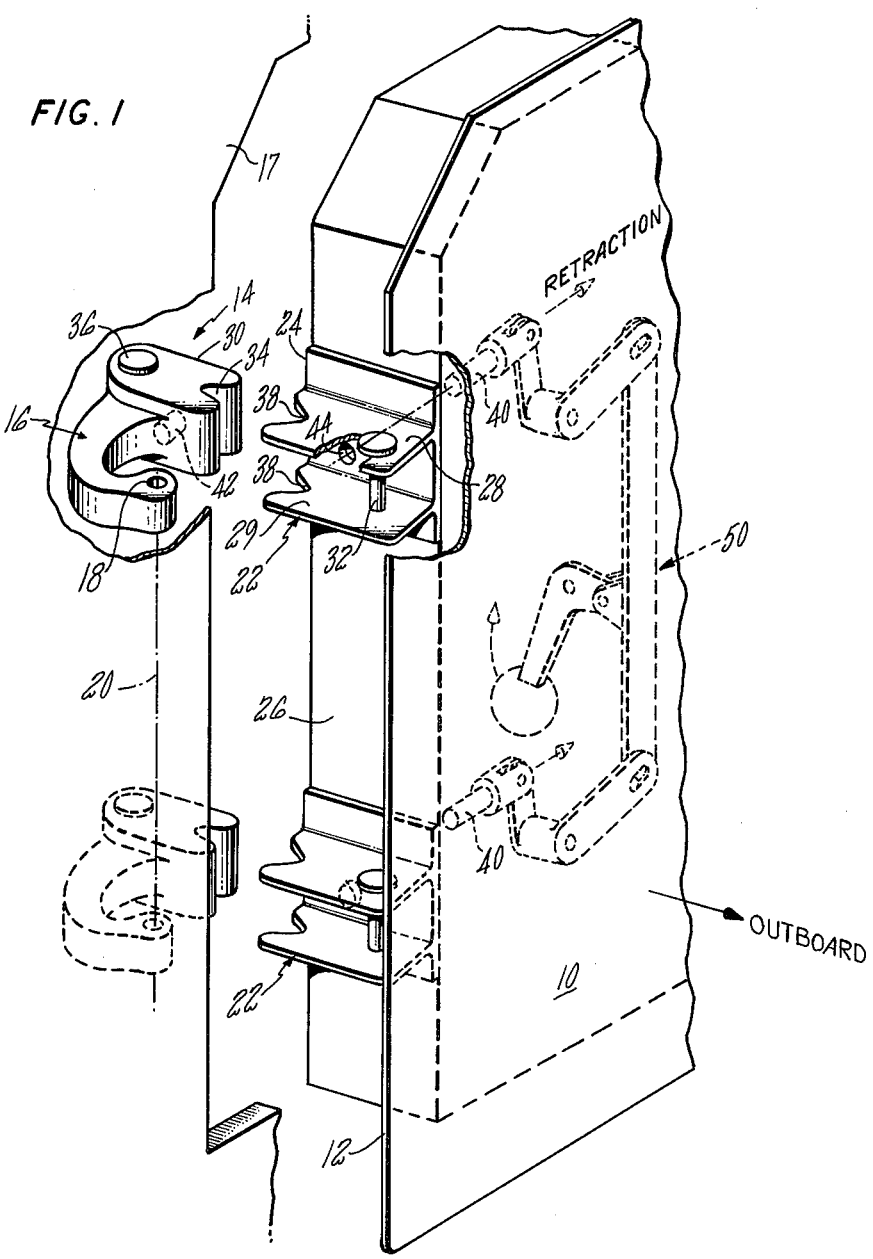

HINGED DOOR QUICK RELEASE

BACKGROUND OF THE INVENTION

1. Field of the Invention

The invention relates to doors for aircraft or other vehicles which must be jettisoned from their frames both rapidly and easily to provide maximum opening for the quick exiting of occupants desiring to avoid or escape a hazard. It specifically pertains to the incorporation of a joint, associated with the door hinge mechanism, to free the door from its otherwise fixed but pivotable engagement with the frame.

2. Description of the Prior Art

Numerous means and devices have been utilized to provide emergency openings or complete release of doors and hatches for exiting of personnel. A number of these means include apparatus to pull or retract the hinge pins of the door or to rotate either the hinge pin or its support in order to align a necked-down portion of one member to a slot in the other member to allow separation of the two. An example of pin retraction is U.S. Pat. No. 2,369,148 to Langhorst, wherein pin-like journal members which normally function to provide pivot motions for mating hinge leaves may be retracted from contact to allow hinge separation. U.S. Pat. No. 2,346,977 to La Sha teaches a jettisonable aircraft door wherein cylindrical pivot pins are flattened locally to allow passage through similarly dimensioned slots in the hinge support when the pins are rotated into proper alignment. U.S. Pat. Nos. 3,032,834 to Carlson and 3,851,845 to Edwards teach similar rotation means. More recent U.S. Pat. No. 4,009,507 to Lascarrou provides mechanism for a cabinet door wherein the hinge pin is not retracted nor rotated, but the flattened cylindrical member rotation concept is followed by utilizing an additional member.

In the environment of the aircraft door to which this invention was initially made, removable or rotatable hinge pins were considered undesirable due to the usually long length of the pins, the resultant long stroke to retract them, and the high force required to be provided to move them due to their loaded condition. A further requirement dictated an aerodynamically smooth door and frame exterior, thus preempting use of a heretofore acceptable means of door jettison wherein a portion of the hinge support is rotated to allow freedom for the hinge pin. The apparatus of such means, including mating hinge members, are located on the aircraft exposed surface where they create undesirable drag.

SUMMARY OF THE INVENTION

This invention addresses the requirement of providing means to positively and quickly release an aircraft door from its attachments while locating the hinge and jettison mechanism within the door or frame so as to introduce no drag penalty. The requirement to hide the hinge mechanism also introduced the need to configure the hinge member so as to allow full door opening without causing jamming between the door and its frame. Due to the size and weight of the door and its hinge structure, it was recognized that considerable force might be necessary to withdraw long and loaded hinge pins, especially if wear and use had produced any galling, surface marring, or bending of the pin. The invention presented herein recognizes these problems associated with the hinge pin and achieves the several requirements by attaching the door to its hinge by a second and non-pivotable joint which is configured to meet the following functional requirements: (1) act as a locked joint under normal flight conditions to react longitudinal, vertical, and sideward door loads and offer restraint in those directions, (2) when unlocked, provide restraint longitudinally, vertically, and inwardly, but allow outward freedom, and (3) provide minimal door loading on the portion of the joint providing the joint unlocking means.

The preferred embodiment meets these criteria by providing longitudinal load reaction and longitudinal, vertical and inward restraint by suitably placed and configured fixed vertical pins adapted to engage lateral slots in respective joint members. Vertical and sideward load reaction is provided through a short retractable horizontal pin. This pin is located internally to the door and thus is isolated from the external elements which would impinge on an exposed hinge during inclement weather. Since the pin is not required to react the longitudinal load of the door, it is not as susceptible to the detrimental aspects of fretting, bending, etc. as is the fully loaded hinge pin.

BRIEF DESCRIPTION OF THE DRAWINGS

FIG. 1 is an isometric view of an aircraft jettisonable door illustrating the door and its frame in partial view, and further depicting the hinge mechanism and the jettison joint of this invention. The several features are presented as disengaged for clarity.

FIG. 2 is an isometric view of one of the two hinges and jettison joints of FIG. 1, but shown in the engaged mode.

DESCRIPTION OF THE PREFERRED EMBODIMENT

The environment of the invention is a vehicle door incorporating a jettison mechanism which will provide rapid disengagement of the hinged side of the door upon actuation by an occupant. The door incorporates as a first joint dual standard goose-neck shaped hinge members adapted to accept vertical pins and thus engage the mating hinge members fixed to the door frame. The invention comprises the addition of a second or jettison joint at each hinge location. This added joint reacts all of the door loads, and provides restraint in all directions in its engaged or locked condition. When unlocked, the load reaction function is removed, but restraint is only removed in the outward direction. The release of the outward retention means allows the door to manually be moved outward to the point where it is automatically freed from restraints in the other direction to drop by its own weight from the opening. Depending on the particular latch mechanism utilized on the door edge opposite the hinge, suitable linkage can be included to release the latch in conjunction with release of the second joint, should this be desired. The release of each jettison joint is accomplished by the retraction of the small horizontally oriented cylindrical pin that locks separable members from relative movement. When locked in place, this pin serves to react vertical and lateral door loads, but longitudinal loads along its axis cannot be reacted. One of the separable members is a U-channel member rigidly attached to the door, and the other member is a goose-necked shaped hinge member that is attached to the door frame through the second hinge member and vertical hinge pin. The channels of the U-channel member enclose a portion of the goose-neck shaped hinge member and provide vertical restraint to the door upon removal of the horizontally retractable pin, while dual pins and slots in the channels and goose-neck shaped hinge provide longitudinal and inward restraint to the door, while allowing unrestricted outward door motion. Configurations other than the U-channel member and the dual pins and slots may be substituted for other applications but consistent with my preferred embodiment. The configurations depicted and described herein have been selected on the basis of trade-offs considering strength and stress, ease of manufacture, tolerance and wear requirement, and cost. As indicated heretofore, the use of a second joint for jettison release has the advantage over hinge pin pulling systems that the retraction pin can be much smaller than the hinge pin due to its lesser load requirement, and will require a lesser retraction pulling force.

DETAILED DESCRIPTION OF THE DEVICE

FIG. 1 illustrates a door 10, adapted to close an opening in the side wall of a vehicle, such as an aircraft, pivoted to open along one vertical edge 12 by dual standard hinge assemblies 14 consisting of a goose-necked shaped portion 16 and its mating hinge portion (not shown) which is fixedly attached to the airframe side wall structure 17. The goose-necked shaped portion is shown with an aperture 18 to receive a standard hinge pin. The purpose of the goose-neck shaped configuration is to provide a hinge offset to allow adequate clearance for the door to be opened fully without contacting the side wall of the aircraft, while being able to draw the door tightly into the opening when closed. Further, the hinge members are located internal to the door and sidewall so as to avoid the drag associated with external protuberants. Such comprises the first joint of the door, and is not considered a part of this invention. To function properly as a hinge in opening the door along its vertical hinge axis 20, the goose-necked shaped portion must be rigidly attached to the door 10. However, it is in this area that dual second joints 22 are introduced and whose function is to provide quick release to outward restraint of the door to allow it to be jettisoned without concern for separation from either vertical hinge attachment. These second or jettison joints 22 are identical, and are associated with both upper and lower hinge assemblies 14. Only one joint need therefore be described. The principal member of the jettison joint 22 is U-channel support 24, which has its flat base fixed rigidly to the framestructure 26 of the door 10. The channel support 24 includes spaced plate members 28 and 29 which are spaced to enclose and restrain vertically the enlarged portion or plug 30 or the goose-neck shaped hinge member 16. This enlarged portion 30 and the U-channel member 24 incorporate restraint stops in the form of pins and slots to allow the joint freedom to release the door outward but prevent it from either longitudinal or inward motion. Pin 32 is fixed in and extends through the plates 28 and 29 of support 24 and aligns with outwardly opening slot 34 in hinge member portion 30, while pin 36 is fixed in the enlarged hinge member portion 30 and aligned to engage inwardly opening slots 38 of plate members 28 and 29 of support 24. Utilized in this configuration, the pins 32 and 36 and associated slots 34 and 38 react the longitudinal door loads, and this provides active restraint in that direction. In the preferred embodiment of this application, clearance is provided between plate members 28 and 29 and enclosed hinge member portion 30. When the primary vertical load reaction means is removed, vertical restraint is provided, as hinge member portion 30 contacts plates 28 or 29. Likewise the lateral engagement between pin 32 and slot 34, or pin 36 and slot 38 will provide an inward restraint. Thus restrained longitudinally, vertically, and inwardly by fixed members, releasable restraint to outward door motion is provided by cylindrical pin 40 which locks hinge portion 30 to U-channel 24 as it protrudes into recess 42 through aperture 44 of these respective members. While cylindrical pins 32, 36 or 40 are depicted and suggested for ease in manufacture, the shape of these pins is optional since none of them function as pivotable members.

In the preferred embodiment there is a closely fitting engagement between pin 40 and aligned apertures 42 and 44 of the separable members 24 and 30. Vertical and lateral door loads are transmitted through pin 40. An alternative to this configuration that may be desired in order to reduce the loads on pin 40 is to change the shape of aperture 42 from the cylindrical shape depicted to a vertical slot, while providing a closer tolerance fit between plates 28 and 29 and enclosed hinge member portion 30. In like manner, aperture 42 could be a suitable positioned horizontal slot to remove inwardly directed door loads from pin 40. A further option to the shape of aperture 42 is a combination of the two slots, possibly in the form of an enlarged and eccentric cylindrical hole. The primary function of pin 40 must be to react outward door loads and restrain the door when the pin is engaged, and to remove the outward restraint when the pin is retracted.

FIG. 2 illustrates the locked mode of this jettison joint wherein the pin 40, illustrated in phantom lines, is in locking engagement with hinge portion 30 and support 24. It can be seen that in this mode the joint is fully locked to restrain the door from motions in all directions.

Returning to FIG. 1, linkage 50 is provided to simultaneously retract both pins 40 upon manual actuation of handle 52. As indicated heretofore, this linkage 50, if desired, may include additional links and pivots to that shown to release the door latch on the side of the door opposite the hinge connection. Such latch and linkage are standard items and do not form a part of this invention.

I wish it to be understood that I do not desire to be limited to the exact details of construction shown and described, for obvious modifications will occur to a person skilled in the art.

I claim:

1. For use with a vehicle door that is pivotable about a vertical axis by one or more hinge joints each having relatively movable mating hinge members, a separate jettison joint at each hinge location comprising first and second support members releasably connected by a retractable pin, wherein said first member is fixedly attached to the door and said second member is an extension of one of the mating hinge members, means associated with said first and second members providing fixed longitudinal, vertical, and inward restraint for the door, wherein the vertical restraint means includes a laterally extending contact stop, the longitudinal and inward restraint means include one or more vertically depending contact stops, said retractable pin providing outward restraint means during engagement with the first and second members.

2. A jettison joint as claimed in claim 1 wherein the first support member is U-channel shaped, having its base portion fixed to the door and its channel portions forming the said laterally extending contact stop enclosing said second support member.

3. A jettison joint as claimed in claim 2 wherein the depending contact stops include dual pins, one pin fixed to said first support member, one pin fixed to said second support member, said support members each having a slot to engage said pins.

4. A jettison joint for a vertically pivotable vehicle door located between the door and the door connected hinge member, comprising fixed vertical, longitudinal, and inward restraint structure and releasable outward restraint means, wherein the vertical restraint structure includes dual vertically spaced stops extending laterally from the door in mating engagement with the door connected hinge member, and wherein the longitudinal and inward restraint structure includes dual spaced and vertically oriented stops affixed individually to the door and hinge member, the door structure and hinge member each having a vertical slot for respective engagement with such stops.

5. A jettisonable door adapted to be received in a door frame defining mechanism comprising:
 (1) a door frame defining mechanism;
 (2) a door snugly fitting into said door frame and shaped so that when not otherwise restrained, the door may be pushed outboard in a first direction free of said door frame;
 (3) means to restrain the door from moving relative to the door frame in the plane thereof comprising:
  (a) a channel shaped member supported from said door or frame and extending therebetween and having:
   (1) spaced plate members each having a slot opening in the inboard direction in the inboard edge thereof, and
   (2) a first pin member extending between said plate members near the opposite edges thereof,
  (b) a plug member supported from the other of said door or frame and extending between said plate members and having:
   (1) a slot opening in the outboard direction in the outboard edge thereof and adapted to engage said first pin member to restrain said door with respect to said door frame in the plane thereof, and
   (2) a second pin member supported near the inboard edge of said plug member and positioned to cooperate with said plate member slot openings to restrain said door with respect to said door frame in the plane thereof so that said door may be jettisoned by being pushed outboard through said door frame.

6. A door according to claim 5 and including means to restrain said door with respect to said door frame in the inboard-outboard direction.

7. A door according to claim 6 and including means to connect said door to said door frame to permit pivot motion of the door with respect to the door frame.

8. A door according to claim 7 wherein said plate members are substantially horizontally projecting, wherein said pin members are in substantially vertical orientation and wherein said slots are in vertically extending orientation.

9. A door according to claim 8 wherein said door restraining means in the inboard-outboard direction comprises a horizontally extending pin member positioned within the door extending through aligned holes in said channel member and said plug member.

10. A door according to claim 9 and including means to retract said pin member of said inboard-outboard door restraining means from said frame for jettisoning.

* * * * *